(12) United States Patent
Castro

(10) Patent No.: US 9,488,224 B1
(45) Date of Patent: Nov. 8, 2016

(54) BALL PLUG FOR A BEARING RACE

(71) Applicant: Indian Rubber Company, Arlington, TX (US)

(72) Inventor: Marco Castro, Fort Worth, TX (US)

(73) Assignee: Indian Rubber Company, Arlington, TX (US)

( * ) Notice: Subject to any disclaimer, the term of this patent is extended or adjusted under 35 U.S.C. 154(b) by 24 days.

(21) Appl. No.: 14/753,855

(22) Filed: Jun. 29, 2015

(51) Int. Cl.
  F16C 43/06 (2006.01)
  F16C 33/66 (2006.01)
  F16C 19/06 (2006.01)
  F16C 43/04 (2006.01)

(52) U.S. Cl.
  CPC ........... F16C 33/6622 (2013.01); F16C 19/06 (2013.01); F16C 33/6607 (2013.01); F16C 43/04 (2013.01); F16C 43/06 (2013.01)

(58) Field of Classification Search
  CPC ............................. F16C 33/6622; F16C 43/06
  See application file for complete search history.

(56) References Cited

U.S. PATENT DOCUMENTS

| | | |
|---|---|---|
| 3,039,494 A | 6/1962 | Bradley |
| 3,148,922 A * | 9/1964 | Roessler, Jr. ........... F16C 43/06 285/276 |
| 4,445,791 A | 5/1984 | Klima |
| 4,568,205 A | 2/1986 | Basener |
| 4,750,573 A | 6/1988 | Wynn |
| 5,026,177 A * | 6/1991 | Masuda ................ F16C 19/362 384/447 |
| 5,027,911 A | 7/1991 | Dysart |
| 5,097,565 A * | 3/1992 | Shorey ................ B60B 33/0002 16/20 |
| 5,228,353 A | 7/1993 | Katahira et al. |
| 6,076,972 A | 6/2000 | Yuasa et al. |
| 6,474,424 B1 | 11/2002 | Saxman |
| 7,547,144 B2 * | 6/2009 | Kunimoto ............. F16C 19/362 384/447 |
| 8,672,060 B2 | 3/2014 | Centala et al. |
| 8,746,374 B2 | 6/2014 | Harrington et al. |
| 2011/0023663 A1 | 2/2011 | Bijai et al. |
| 2012/0193150 A1 | 8/2012 | Gallifet et al. |

FOREIGN PATENT DOCUMENTS

| | | |
|---|---|---|
| EP | 2042761 A1 | 4/2009 |
| WO | 2014092720 A1 | 6/2014 |

* cited by examiner

*Primary Examiner* — Thomas R. Hannon
(74) *Attorney, Agent, or Firm* — Whitaker Chalk Swindle & Schwartz PLLC; Charles D. Gunter, Jr.

(57) ABSTRACT

A ball plug seals a bearing race holding ball bearings and grease. The plug has a rubber body with a pair of metal disks on an upper surface. The metal disks are separated by a gap so that when they are urged toward one another, the rubber body is compressed. This allows the outer periphery of the metal disks to be received in a mating circumferential groove provided adjacent an end opening of the bearing race. Upon release of the metal disks, the rubber body relaxes and the plug is securely retained within the opening of the bearing race.

15 Claims, 3 Drawing Sheets

BALL PLUG FOR A BEARING RACE

BACKGROUND OF THE INVENTION

1. Field of the Invention

The present invention relates generally to a self-locking and sealing ball plug that holds ball bearings and grease in position within a bearing race once installed, and which provides a visual aid to determine if the plug has been properly installed.

2. Description of the Prior Art

Plug seals for bearing races are well known in the prior art and assume a variety of shapes, sizes and degrees of design complexity. For example, there are many consumer and industrial applications where a swivel or other type rotary joint utilizes an internal bearing race which houses a series of ball bearings and grease. Swivel joints of this type are used for a broad range of applications in the petroleum, machine tool, chemical, refining, mining, distilling, brewing, and paint industries, as well as farm irrigation and fertilizing, and hundreds of OEM applications. Design, maintenance and plant engineers use swivel joints in flexible piping systems, loading arms, hose reels, sewer rodding and wastewater treatment equipment, and various types of process machinery. They are also widely used for machine tool coolant transfer, drum filling applications, and a variety of in-plant fluid and dry bulk transfer operations. Other common applications include hose reels, aviation refueling carts, hoses, steel mill cooling water lines, floating suction assemblies, floating roof drains, highway construction equipment, firefighting equipment, aviation ground support equipment and drum/tote fillers.

General purpose swivel joints are available from a large number of commercial sources, including to name a few, the FMC Chiksan® line, WECO Swivel Seals™, PPW Engineered Systems Swivel Seals™ and Scott Rotary Seals™.

Another common use of ball plugs is in the petroleum drilling industry. Many drill bit designs utilize a removable ball loading hole plug for plugging a ball bearing race where the ball bearing holds a rotary cutter on the bit body while allowing it to rotate. In this regard, see for example, the following exemplary patents: U.S. Pat. No. 4,445,791, to Klima; U.S. Pat. No. 2,676,790 to Turner; U.S. Pat. No. 1,779,587 to Childs; and U.S. Pat. No. 3,989,315 to Murdoch. All of these patented designs use some sort of ball plug to either temporarily or permanently plug a ball bearing race.

These are just two of a myriad of examples of ball bearing races in use in various commercial and industrial designs at the present time. However, despite the fact that such bearing race plugs have existed for many years, the common designs tend to be overly complex, or suffer from other disadvantages. For example, some of the prior art designs must be destroyed to be removed for grease replacement, or for repairing or replacing damaged bearing balls or to remove the companion part associated with the bearing race.

A need continues to exist, therefore, for a ball plug for a bearing race which is simple in design and economical to manufacture and which can be easily installed and removed by hand or with a simple tool, such as a pair of pliers.

SUMMARY OF THE INVENTION

The present invention is an improved ball plug for a bearing race where the bearing race has an end opening for loading a plurality of ball and grease, the bearing race having a circumferential groove formed therein adjacent the end opening thereof. The ball plug includes a plug body formed of a flexible, compressible material, the plug body having a top surface, generally cylindrical sidewalls and a bottom surface. A pair of rigid disks are attached to the plug top surface, the rigid disks being separated by a gap at one central location on the top surface of the plug. Each of the disks has an arcuate outer periphery and a planar internal wall, the planar internal walls of the disks being separated by the gap. A flange in the form of an upright wall section extends generally normal to the top surfaces of each of the disks at a location adjacent the planar internal walls thereof. A user can grasp the disk upright wall sections by hand or with a simple tool such as a pair of pliers and squeeze the upright wall sections together so that the rubber body is compressed and so that the outer peripheries of the metal disks can be received within the circumferential groove formed in the bearing race. Upon release of the upright wall sections, the rubber body relaxes and the plug is securely retained within the opening of the bearing race.

Preferably, the plug body is formed of a natural or synthetic elastomeric material, such as a natural or synthetic rubber. The rigid disks can conveniently be formed of metal such as steel, or conceivably even a hard plastic or composite material. The outer peripheries of the metal disks extend out from the upper surface of the plug body a slight amount so that they overhang the cylindrical sidewalls of the plug body.

In a preferred version of the device, the bottom surface of the plug body has a concave recess formed therein which assumes the shape of one half of the cross section of the bearing race. A circumferential rubber rib surrounds the plug body at one circumferential location. The rubber rib compresses against the walls of the end opening of the bearing race to increase the sealing contact of the plug body with the walls of the end opening. Preferably, the metal disks are stainless steel disks which are bonded to the top surface of the plug body and, with the rubber of the plug body, provide enough flexibility as to create the gap between the disks and rigidity to maintain the plug in position once installed as a locking device.

A method is also shown for installing a ball plug within a bearing race and subsequently removing the plug from the race without destroying the plug. The previously described plug is installed as has been described by compressing the rubber body using the upright flanges on the two metal disks and then allowing the rubber body to relax, leaving the metal disks received in the circumferential groove formed adjacent the opening in the bearing race. The plug can be removed from the bearing race opening by grasping the disk upright wall sections and applying enough force to collapse the two disks toward each other and pulling the plug from the opening.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
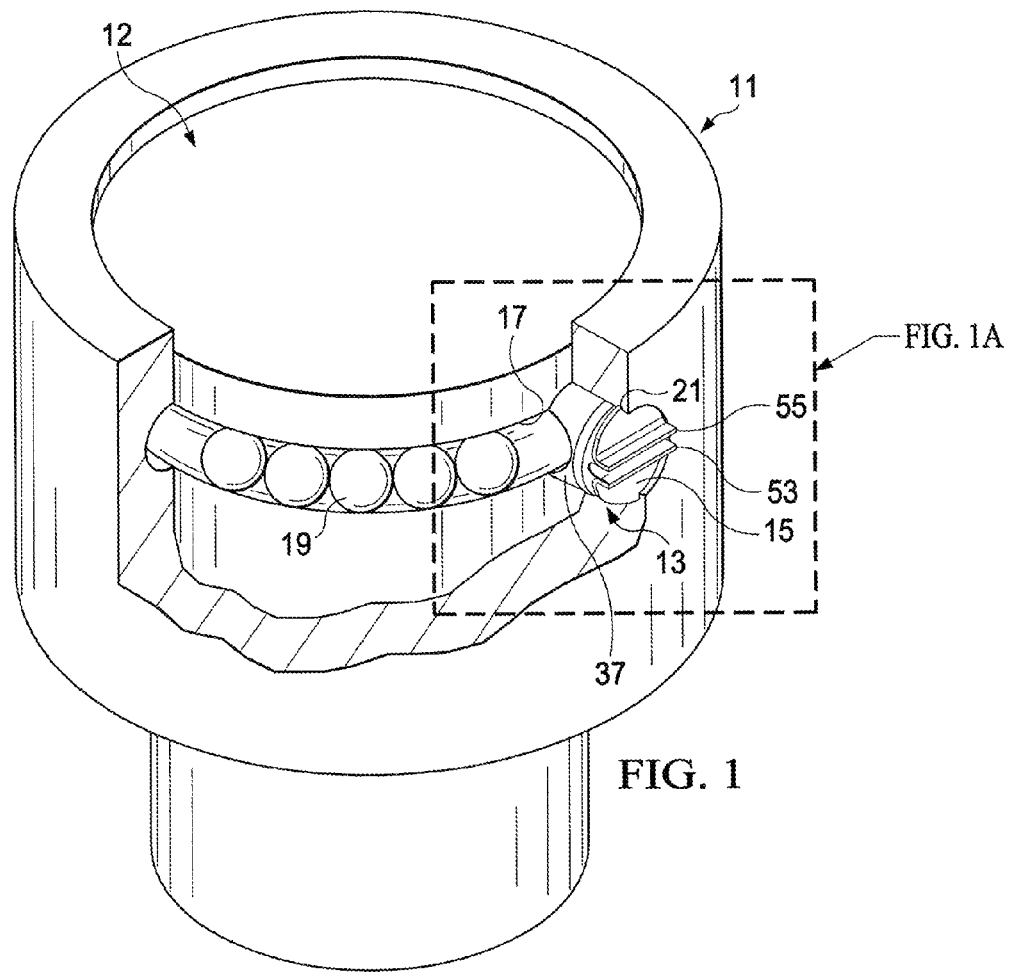
FIG. 1 is a perspective view, partly broken away, of one component of a commercially available elbow swivel joint which shows the bearing race containing a plurality of ball bearings, the opening of which is sealed by the ball plug of the invention.
Figure 1A:
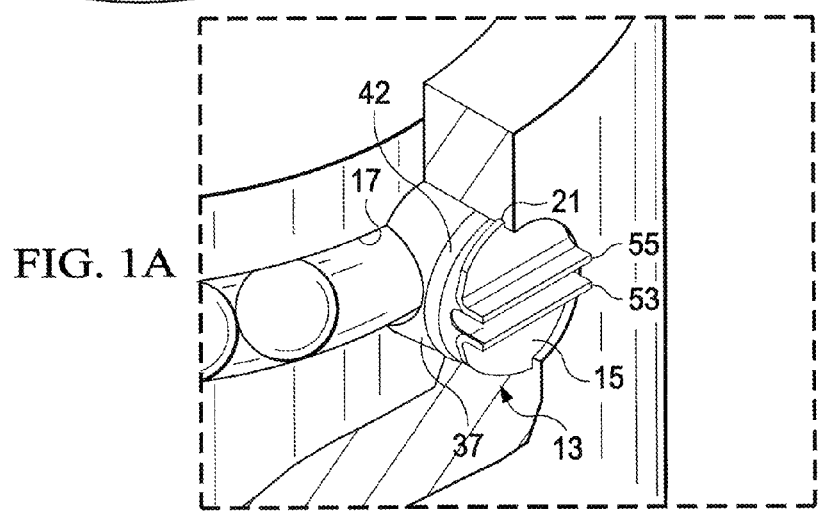
FIG. 1A is a close-up, isolated view of the plug of the invention installed in the bearing race of the device of FIG. 1.

Turning to FIG. 1, there is shown one component of what is commonly referred to in the relevant industries as an "elbow swivel joint" or just a "swivel joint," designated generally as 11. As mentioned in the Background discussion, there are many applications for sealed bearing races containing a plurality of balls and grease. This example is merely intended to be illustrative of such applications. The invention is specifically concerned with the "ball plug" 13 shown in FIG. 1 which has been used to plug an end opening (generally at 15) of a bearing race 17. The bearing race is a circumferential groove which runs around the circumference of the swivel joint body and which houses a plurality of ball bearings 19. The raceway will also typically contain a given quantity of grease which is used to lubricate the ball bearings and the walls of the raceway. The bearing race has an end opening 15. A secondary circumferential groove 21 is formed therein adjacent the end opening 15 thereof. FIG. 1A shows this secondary circumferential groove 21 which runs around the mouth opening region in slightly larger detail. As will be explained more fully, portions of the ball plug 13 engage this secondary groove 21 to securely retain the ball plug in the end opening of the bearing race 17. The component 11 shown in FIG. 1 would be designed to receive an "elbow" or other swivel component with the bearing raceway allowing movement of the mating component when it was received in the interior region (12 in FIG. 1).

Figure 5A:
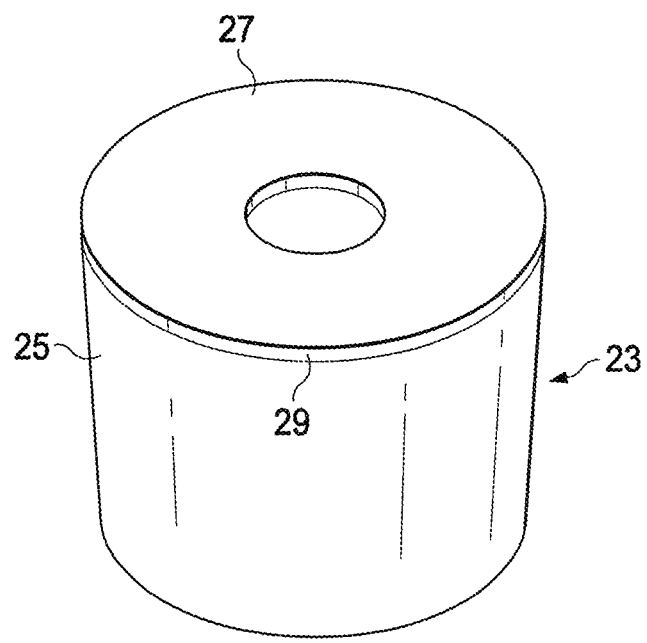
FIG. 5A is a perspective view of a prior art ball plug which has a groove around the upper periphery for receiving a snap ring.
Figure 5B:
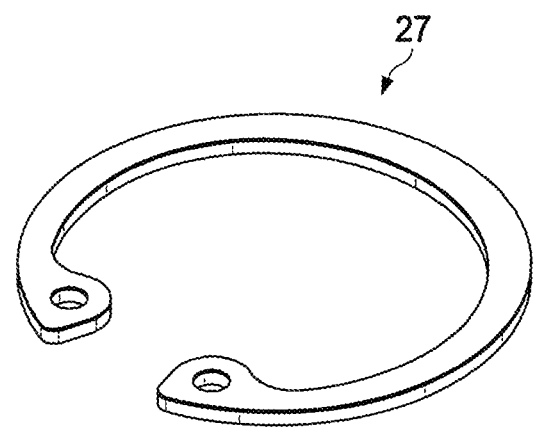
FIG. 5B shows a prior art snap ring of the type which could be used with the ball plug of FIG. 5A.

FIG. 5A shows a prior art ball plug 23. The prior art plug had a rubber plug body 25 to which was bonded a thin metal disk 27 on a top or outer surface of the plug body. A snap ring was received in the circumferential groove 29 with circumscribes the top periphery of the plug body 25. The snap ring was slightly oversized so that it could be expanded with a suitable tool, placed about the groove 29, and then released, leaving the snap ring located on the groove 29 on the plug body. By subsequently compressing the snap ring, the plug body could be placed in the opening of the bearing race (15 in FIG. 1) with the disk 27 facing outwardly. When the snap ring was released, it expanded in size, thereby engaging the circumferential groove 21 provided adjacent the mouth opening of the bearing race.

This system certainly was acceptable in plugging the bearing race. However, the prior art plug shown in FIG. 5A was more or less permanently installed using the previously described installation method. It was generally not possible to remove the snap ring and plug body without damaging or destroying the parts. This was a disadvantage as access to the bearing race was needed on occasion to repair or replace ball bearings or to replace the grease in the bearing race.

Figure 2:
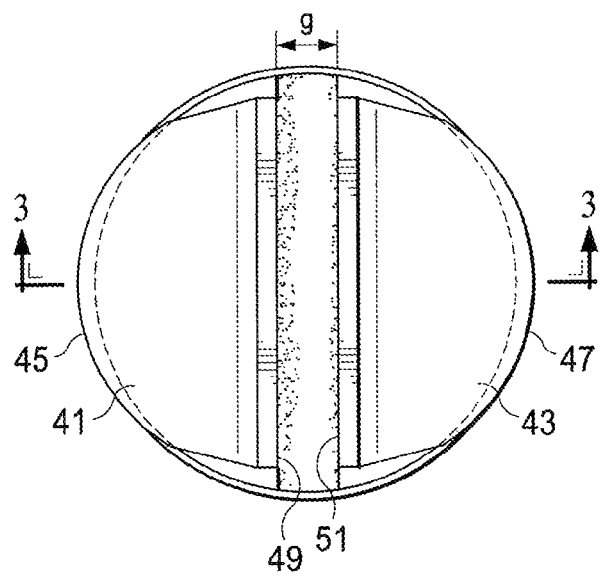
FIG. 2 is a top view of the ball plug of the invention.
Figure 3:
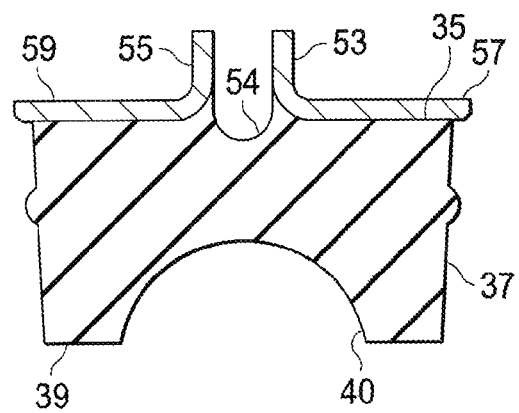
FIG. 3 is a side, cross sectional view of the ball plug of the invention taken along lines 3-3 in FIG. 2.
Figure 4:
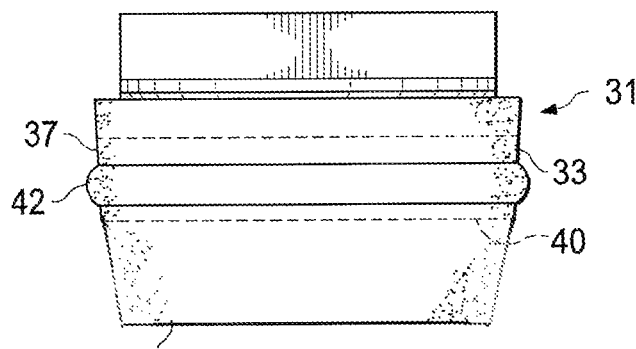
FIG. 4 is side, plan view of the ball plug.

The improved ball plug of the invention is shown in greater detail in FIGS. 2-4, designated generally as 31. The improved ball plug 31 has a plug body 33 formed of a flexible, resilient material, such as a natural or synthetic rubber, for example a 80 durometer nitrile rubber. The plug body has a top surface 35, generally cylindrical sidewalls 37 and a bottom surface 39. A circumferential rubber rib 42 surrounds the plug body 33 at one circumferential location. The rubber rib compresses against the walls of the end opening of the bearing race to increase the sealing contact of the plug body against the walls of the end opening. The bottom surface 39 of the plug body as a concave recess 40 formed therein which, as will be more fully described, allows the plug body to expand or to be compressed to some extent. In other words, the plug body shown in FIG. 3 can be acted upon by an outside force to move from the relaxed state shown in FIG. 3 to an expanded state where the concave recess is stretched or expanded. It also takes the shape of one half of the cross section of the bearing race so that balls could pass through the recess opening.

A pair of rigid disks (41 and 43 in FIG. 2) are attached to the plug top surface 35. The rigid disks could be made of a variety of hard materials, such a suitable metal, hard plastic or composite material. Preferably the rigid disks are a suitable metal, such as stainless steel. As will be appreciated from FIG. 2, the metal disks 41, 45 are initially separated by a gap ("g" in FIG. 2) at one central location on the top surface of the plug body. Each of the disks 41, 43 has an arcuate outer periphery 45, 47 and a planar internal wall 49, 51. The planar internal walls 49, 51 of the disks run generally parallel to each other and are separated by the gap "g" shown in FIG. 2 when the plug body is in a relaxed state. As perhaps best seen in FIG. 3, an upright wall section or flange 53, 55 extends generally normal to the top surfaces of each of the disks and runs for approximately the length of the adjacent planar internal walls 49, 51. As can also be seen in FIG. 3, the outer peripheries of the top surfaces 57, 59 of the metal disks extend out from the upper surface 35 of the plug body a slight amount so that they overhang the cylindrical sidewalls 37 of the plug body.

While not wishing to be bound by particular dimensions which will vary depending upon the end application of the ball plug, one exemplary plug with a rubber body width of approximately 0.635 inches had a gap "g" of approximately 0.092 inches between the two upright wall sections 53, 55.

It will be appreciated from the previous discussion that a user of the ball plug can grasp disk upright wall sections (53, 55 in FIG. 3) and squeeze the upright wall sections together so that the rubber body 37 is compressed and so that the outer peripheries of the metal disks 57, 59 can be received within the circumferential groove (21 in FIG. 1) formed in the bearing race 17. In this way, upon release of the upright wall sections 53, 55 the rubber body 37 returns from the compressed state to a relaxed state and the plug is securely retained within the opening 15 of the bearing race 17. In the most preferred form, the metal disks 41, 43 are stainless steel disks which are bonded to the top surface of the plug body and, with the rubber of the plug body, provide enough flexibility as to create the gap "g" between the disks and rigidness to maintain the plug in position once installed as a locking device.

A method is also shown for installing a ball plug 13 within a bearing race 17 and subsequently removing the plug from the race without destroying the plug. The previously described plug 13 is installed as has been described by compressing the rubber body 37 using the upright flanges 53, 55 on the two metal disks 41, 43 and then allowing the rubber body to relax, leaving the metal disks received in the circumferential groove 21 formed adjacent the opening 15 in the bearing race 17. The plug can be removed from the bearing race opening by grasping the disk upright wall sections 53, 55 and applying enough force to collapse the two disks toward each other and pulling the plug from the opening. It may be necessary to use a simple hand tool, like a pair of pliers to grasp the upright wall sections 53, 55. However, the plug of the invention can be removed from the bearing race easily and without damaging or destroying the plug.

With reference to FIG. 3, another aspect of the plug assembly of the invention is that the upper groove (54 in FIG. 3) can be visually aligned with the concave recess 40 in the bottom surface of the plug body during assembly, since the plug will be turned side wise during the assembly. This alignment provides a visual aid to proper assembly of the plug in the end opening of the bearing race.

A invention has been provided with several advantages. The ball plug of the invention is relatively simple in design and economical to manufacture. The "collapsible ball plug" of the invention is a self-locking/sealing plug that holds ball bearings and grease in position once installed, and provides a visual aid to determinate that the plug is been properly installed. The two separate stainless steel disks which are bonded with the rubber body of the plug provide enough flexibility to create a gap between the disks and rigidness to maintain the plug in position once installed acting as a locking device. An upper gap between the metal disks allows the inserts to be collapsed inwardly toward each other and to be inserted into the mating nest of the bearing race. A concave recess on the bottom surface of the ball plug body can be visually aligned with the gap between the metal disks on the top surface which provides a visual aid to determine the correct assembly of the device. The rubber body portion of the device seals the bearing race cavity to prevent the leaking of the grease. Once installed, the plug can be easily removed using a pair of pliers and applying enough gripping force to collapse the two metals disks while pulling back on the plug body.

While the invention has been shown in only one of its forms, it is not thus limited but is susceptible to various changes and modifications without departing from the spirit thereof.

What is claimed is:

1. A ball plug for a bearing race where the bearing race has an end opening for loading a plurality of ball and grease, the bearing race having a secondary circumferential groove formed therein adjacent the end opening thereof, the ball plug comprising:
a plug body formed of a flexible, compressible material, the plug body having a top surface, generally cylindrical sidewalls and a bottom surface;
a pair or rigid disks attached to the plug top surface, the rigid disks being separated by a gap at one central location on the top surface of the plug, each of the disks having an arcuate outer periphery and a planar internal wall, the planar internal walls of the disks being separated by the gap, and wherein an upright wall section extends generally normal to the top surfaces of each of the disks at a location adjacent the planar internal walls thereof;
whereby a user can grasp the disk upright wall sections and squeeze the upright wall sections together so that the rubber body is compressed or expanded and so that the outer peripheries of the metal disks can be received within the circumferential groove formed in the bearing race, and whereby upon release of the upright wall sections the rubber body relaxes and the plug is securely retained within the opening of the bearing race.

2. The ball plug of claim 1, wherein the plug body is formed of a natural or synthetic elastomeric material.

3. The ball plug of claim 2, wherein the plug body is formed of a natural or synthetic rubber.

4. The ball plug of claim 1, wherein the rigid disks are formed of metal.

5. The ball plug of claim 4, wherein the metal disks are stainless steel disks which are bonded to the top surface of the plug body and, which with the rubber of the plug body provide enough flexibility as to create the gap between the disks and rigidness to maintain the plug in position once installed as a locking device.

6. The ball plug of claim 1, wherein the outer peripheries of the metal disks extend out from the upper surface of the plug body a slight amount so that they overhang the cylindrical sidewalls of the plug body.

7. The ball plug of claim 1, wherein the bottom surface of the plug body has a concave recess formed therein.

8. A ball plug for a bearing race where the bearing race has an end opening for loading a plurality of ball and grease, the bearing race having a secondary circumferential groove formed therein adjacent the end opening thereof, the ball plug comprising:
a plug body formed of rubber and having a top surface, generally cylindrical sidewalls and a bottom surface;
a pair of rigid metal disks attached to the plug top surface, the rigid metal disks being separated by a gap at one central location on the top surface of the plug, each of the disks having an arcuate outer periphery and a planar internal wall, the planar internal walls of the disks running parallel to each other and being separated by the gap, and wherein an upright wall section extends generally normal to the top surfaces of each of the disks and runs for approximately the length of the adjacent planar internal walls;
whereby a user can grasp the disk upright wall sections and squeeze the upright wall sections together so that the rubber body is compressed and so that the outer peripheries of the metal disks can be received within the circumferential groove formed in the bearing race, and whereby upon release of the upright wall sections the rubber body relaxes and the plug is securely retained within the opening of the bearing race.

9. The ball plug of claim 8, wherein the outer peripheries of the metal disks extend out from the upper surface of the plug body a slight amount so that they overhang the cylindrical sidewalls of the plug body.

10. The ball plug of claim 8, wherein the bottom surface of the plug body has a concave recess formed therein.

11. The ball plug of claim 8, wherein the metal disks are stainless steel disks which are bonded to the top surface of the plug body and, which with the rubber of the plug body provide enough flexibility as to create the gap between the disks and rigidness to maintain the plug in position once installed as a locking device.

12. The ball plug of claim 8, wherein a circumferential rib surrounds the plug body at one circumferential location, the circumferential rib being compresses against the walls of the end opening of the bearing race to thereby increase the sealing contact of the plug body with the walls of the end opening.

13. A method of installing a ball plug within a bearing race where the bearing race has an end opening for loading a plurality of ball and grease, the bearing race having a secondary circumferential groove formed therein adjacent the end opening thereof, the method comprising the steps of:

providing a plug body formed of a flexible, compressible material, the plug body having a top surface, generally cylindrical sidewalls and a bottom surface;

bonding a pair or rigid metal disks to the plug top surface, the rigid disks being separated by a gap at one central location on the top surface of the plug, each of the disks having an arcuate outer periphery and a planar internal wall, the planar internal walls of the disks being separated by the gap, and wherein an upright wall section extends generally normal to the top surfaces of each of the disks at a location adjacent the planar internal walls thereof;

installing the plug body within the opening of the bearing race by grasping the disk upright wall sections and squeezing the upright wall sections together so that the rubber body is compressed and so that the outer peripheries of the metal disks can be received within the circumferential groove formed in the bearing race, and whereby upon release of the upright wall sections the rubber body relaxes and the plug is securely retained within the opening of the bearing race.

14. The method of claim 13, further comprising the step of removing the ball plug from the bearing race opening by grasping the disk upright wall sections and applying enough force to collapse the two disks toward each other and pulling the plug from the opening.

15. The method of claim 13, whereby the disk upright wall sections are grasped with a pair of pliers.

* * * * *